United States Patent [19]

Krusche

[11] Patent Number: 4,559,778
[45] Date of Patent: Dec. 24, 1985

[54] CONTROL DEVICE FOR A HYDROSTATIC TRANSMISSION

[75] Inventor: Alfred Krusche, Johannesberg, Fed. Rep. of Germany

[73] Assignee: Linde Aktiengesellschaft, Wiesbaden, Fed. Rep. of Germany

[21] Appl. No.: 384,800

[22] Filed: Jun. 4, 1982

Related U.S. Application Data

[63] Continuation-in-part of Ser. No. 42,295, May 25, 1979, abandoned.

[30] Foreign Application Priority Data

May 30, 1978 [DE] Fed. Rep. of Germany ....... 2823559

[51] Int. Cl.⁴ .......................................... F16H 39/46
[52] U.S. Cl. ..................................... 60/447; 60/449; 60/452; 60/911; 417/217
[58] Field of Search ................. 60/443, 444, 445, 447, 60/449, 452, DIG. 911, 431; 417/218, 34, 222, 217

[56] References Cited

U.S. PATENT DOCUMENTS

| | | | |
|---|---|---|---|
| 3,054,263 | 9/1962 | Budzich et al. | 60/447 |
| 3,127,745 | 4/1964 | Young | 60/444 |
| 3,166,891 | 1/1965 | Weisenbach | 60/389 |
| 3,180,090 | 4/1965 | Hawley et al. | 60/444 |
| 3,543,508 | 12/1970 | Schwab | 60/445 X |
| 3,785,754 | 1/1974 | Miller | 60/449 X |
| 3,788,773 | 1/1974 | Van Der Kolk | 60/444 |
| 3,817,033 | 6/1974 | Appel et al. | 60/444 |
| 3,881,317 | 5/1975 | Swoager | 60/444 |
| 3,903,756 | 9/1975 | Hamma | 60/431 X |
| 3,935,707 | 2/1976 | Murphy et al. | 417/218 X |
| 3,969,896 | 7/1976 | Louis | 60/431 |
| 3,999,387 | 12/1976 | Knopf | 60/444 |
| 4,017,215 | 4/1977 | Butler | 60/447 |
| 4,022,023 | 5/1977 | Inaba et al. | 60/445 |
| 4,077,212 | 3/1978 | Foster | 60/445 X |
| 4,158,529 | 6/1979 | Nonnemacher et al. | 417/218 |
| 4,168,612 | 9/1979 | Nikolaus | 60/431 |
| 4,203,712 | 5/1980 | Uehara | 60/447 |

FOREIGN PATENT DOCUMENTS

| | | | |
|---|---|---|---|
| 1555480 | 4/1970 | Fed. Rep. of Germany . | |
| 2629981 | 1/1978 | Fed. Rep. of Germany | 60/445 |
| 76573 | 6/1977 | Japan | 60/452 |
| 1415977 | 12/1975 | United Kingdom | 417/218 |

*Primary Examiner*—Edward K. Look
*Attorney, Agent, or Firm*—Buell, Ziesenheim, Beck & Alstadt

[57] ABSTRACT

An apparatus for use in controlling a variable displacement pump in a hydrostatic transmission comprises servo-positioning means for varying the displacement of the variable displacement pump, signal producing means for producing a first signal dependent on the rotational speed of the input shaft of the variable displacement pump and means communicating the first signal dependent on the rotational speed of the input shaft to the servo-positioning means to increase or decrease the displacement of the variable displacement pump as the rotational speed of the input shaft increases or decreases. A second signal dependent on the output pressure of the variable displacement pump is communicated to the servo-positioning means to act in opposition to the first signal to tend to reduce or increase the displacement of the variable displacement pump.

5 Claims, 6 Drawing Figures

CONTROL DEVICE FOR A HYDROSTATIC TRANSMISSION

BACKGROUND AND SUMMARY OF THE INVENTION

This application is a continuation-in-part of application Ser. No. 042,295, filed May 25, 1979, and now abandoned.

The invention relates to a control device for a hydrostatic transmission having a signal-transmitter indicating the r.p.m. of the input shaft to the transmission; the signal, in turn, influences the setting of a variable displacement pump in the transmission.

In known control devices of this kind, the signal-transmitter which indicates the r.p.m. of the input shaft to the transmission is a constant-displacement pump which is driven from the input shaft to the transmission. The discharge flow from this pump flows to a restrictor, and the pressure dammed up before the restrictor acts upon a positioning piston. The positioning piston can slide against the force of a spring and is connected directly to the adjusting member of a variable displacement pump of the hydrostatic transmission. Because of the use of a fixed-displacement pump in this type of prior art device, the discharge flow fed to the restrictor is proportional to the r.p.m. In accordance with the throttling characteristics of the restrictor, the pressure rises correspondingly before the restrictor in proportion to the square of the r.p.m. of the input shaft to the transmission as shown in West German Auslegungschrift No. 1555480. In this way, the transmission setting is controlled as a function of the square of input r.p.m.

In the case of larger pumps for larger hydrostatic transmissions, considerable positioning forces arise which must be overcome to vary the adjustment of the pump. Since, on the other hand, only a limited pressure can be generated before the restrictor with an acceptable power consumption, relatively large positioning pistons must be employed in the case of this known device. To this is added the fact that the positioning forces vary as a function of the "back pressure" created by the device which is operated by the transmission. Friction in the adjusting mechanism also influences the position of adjustment. Together these factors have the result that even at constant r.p.m. of the input shaft to the transmission there is some variation in the position of adjustment on the hydrostatic pump.

The object of the invention is to eliminate this disadvantage and to create a positioning device in which the position of adjustment is free of undesirable influences.

According to the present invention, the signal emitted by the signal-transmitter of the, input r.p.m. to the transmission acts upon the input member of a servo-positioning device of the hydrostatic transmission. In the case of hitherto known hydrostatic transmissions having servo-positioning devices, what acts upon the input member of the hydrostatic transmission is either an independently selected positioning signal or a positioning signal emitted by a kind of signal transmitter other than that used in the present invention.

In the case of a control device constructed in accordance with the present invention, a fixed-displacement pump driven from the input shaft to the transmission generates the signal and the pressure before a restrictor in the discharge flow from this pump acts upon a pilot piston of a servo-positioning device. Since practically no positioning forces and extremely low frictional forces act upon this pilot piston, exact control is achieved.

The restrictor in the discharge flow can be made adjustable, for example, and responsive to either a manually selected signal representing the demand for power from the engine or a feedback signal from a circuit controlling the desired power output from the transmission. Use of variable restrictor also provides for fine control.

In addition, the present invention provides for a second signal transmitter which delivers a signal dependent upon the discharge pressure from the variable displacement pump. This "back pressure" also acts upon the servo-positioning device, but in a direction opposed to the direction of the signal dependent upon input r.p.m.

In an alternate embodiment of the present invention the "back pressure" acts in another way upon the pilot piston of the servo-positioning device. For example, it may be arranged that a drain and drain valve are connected before the pressure chamber in which the pilot piston of the servo-positioning device can slide. The drain valve is controlled by the "back pressure". In this case a further modification is required to limit the flow from the fixed-displacement pump to the drain. An additional flow restrictor is arranged in the conduit through which the pressure is led to the pilot piston, between the point of connection of the drain valve and the point at which the pressure is taken off.

In another embodiment of the present invention, the "back pressure" is used to operate a solenoid regulating valve which controls the pressure being fed to the working chamber in front of the end face of the pilot piston. The refinement with regulating solenoid valves is particularly advantageous when the transmission is already equipped with regulating solenoid valves for other reasons.

In the case of a hydrostatic transmission of the type mentioned above in which the variable displacement pump can be set in both directions of discharge, the idea is known of providing one positioning piston for each direction of discharge and connecting the two pressure chambers in front of the two positioning pistons to a conduit carrying the pressure via a selectively actuatable changeover valve (West German Auslegungschrift No. 1555480). But if a solenoid valve is arranged before each of these two pressure chambers, this changeover valve is superfluous since it is sufficient at any time to open one of the two solenoid valves.

Where regulating solenoid valves are used, it is also possible to design the transmission control in accordance with the present invention to be purely electrical. In this case the input shaft to the transmission is connected with a three-phase generator or a tachometer generator or some other electrical signal transmitter which sends out a signal dependent upon the r.p.m. of the input shaft to the transmission. The tachometer is connected to the regulating solenoid valves. In that case it is possible to superimpose upon this signal and to override it purely electrically by an electrical signal indicating high "back pressure" in the transmission, or to feed these two signals to separate solenoids of the regulating solenoid valve.

BRIEF DESCRIPTION OF THE DRAWINGS

Preferred embodiments of the present invention are illustrated in the accompanying drawings in which.

DESCRIPTION OF PREFERRED EMBODIMENTS

Figure 1:
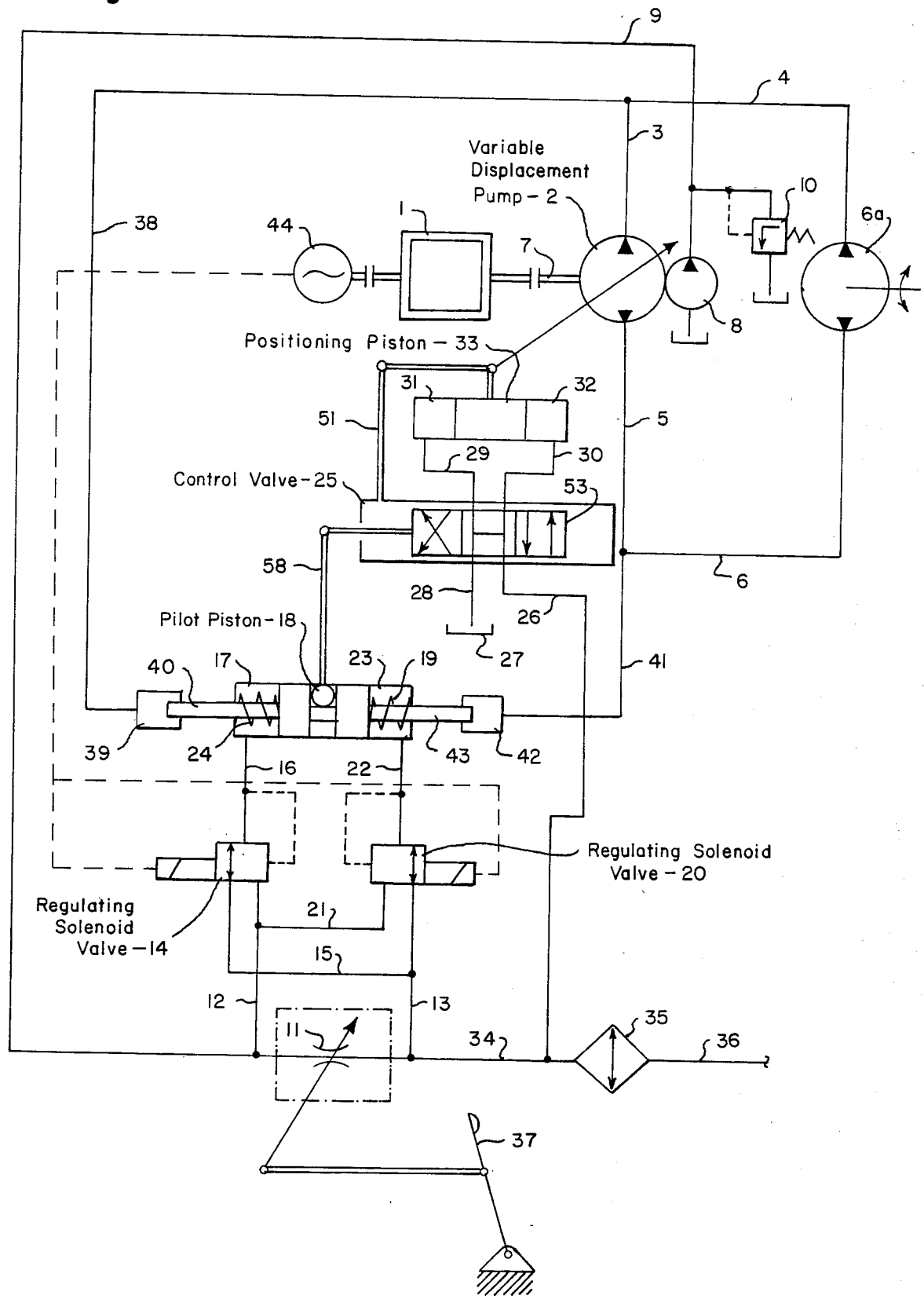
FIG. 1 shows a diagram with part of the transmission circuit and the part of the circuit provided for the control of a positioning pump by means of pressure before a restrictor.

An internal combustion engine 1 drives the adjustable hydraulic pump 2 which is connected via the conduits 3 and 4 on the one side and 5 and 6 on the other side to a hydraulic motor 6a.

The engine 1 drives the variable displacement pump 2 via a shaft 7 from which a constant-discharge auxiliary pump 8 is also driven. The auxiliary pump 8 delivers to a restrictor 11 via a conduit 9 and is protected by a pressure relief valve 10. The pressure head in front of and behind the restrictor 11 is represented by the pressure difference in the two conduits 12 and 13. The conduit 12 leads to a regulating solenoid valve 14 to which the conduit 15 is also connected. Conduit 15 in turn is connected to the conduit 13. From the regulating solenoid valve 14 a conduit 16 leads to the pressure chamber 17 in a cylinder in which the pilot piston 18 can slide toward the right in the drawing against a spring 19.

In a corresponding way the conduit 13 leads to a regulating solenoid valve 20 to which a further conduit 21 is connected which in turn is connected to the conduit 12. From the regulating solenoid valve 20 a conduit 22 leads to the pressure chamber 23 which acts upon the second end face of the pilot piston 18 which bears at the other side against a spring 24.

The pilot piston 18 is connected with the spool of the control valve 25. One side of the control valve 25 connects with a conduit 26 carrying pressure from downstream of the restrictor 11. The other side of the control valve 25 connects with a drain conduit 28 leading to a drain 27. Two conduits 29 and 30 lead from the control valve 25 to the pressure chambers 31 and 32 which act upon the two end faces of positioning piston 33. The positioning piston is directly connected with the pump 2 to vary its displacement.

The conduit 26 is in this case connected to the conduit 34 downstream of the restrictor 11, which leads via the cooler 35 and if necessary a filter to the conduit 36 from which further pressure may be taken off. But, the conduit 26 could also be connected via a changeover valve or two non-return valves to whichever of the two conduits 4 or 6 is carrying the low pressure at the time. In another design the conduit 26 may also be connected via a changeover valve or corresponding non-return valves to whichever of the conduits 4 or 6 is carrying the high pressure at the time or to the one carrying the low pressure at the time (the positioning piston 33 must then be dimensioned accordingly).

If further pressure is not to be taken off via the conduit 34, the pressure head does not need to be taken off via the conduits 12 and 13, but in this case only the conduit 12 with the conduit 21 is necessary.

For fine control, in particular for manual setting of the transmission at low r.p.m., the restrictor 11 is adjustable by means of the actuator member 37 which may be either a gas pedal or a hand lever connected to the setting element of engine 1. The lever 37 is adjusted to select the desired speed of the engine. Restrictor 11 can be connected with and adjusted by lever 37 so that the pressure difference between conduits 12 and 13 will be directly proportional to engine speed. When gas pedal 37 is pushed all the way down, the restrictor 11 is fully open, and the control signal corresponds to the maximum power output setting of the engine. When the engine 1 is set to a lower power output (lower rpm), the restrictor 11 is adjusted accordingly, and the control signal corresponds to the new lower power output setting of the engine.

A conduit 38 is connected to the conduit 4 and leads to a pressure chamber 39 in which an auxiliary piston 40 is acted upon. The auxiliary piston 40 bears against the pilot piston 18. In the same way a conduit 41 is connected to the conduit 6 and leads to a pressure chamber 42 in which an auxiliary piston 43 is able to slide, and which in turn bears on the other side against the pilot piston 18.

The method of operation is as follows:

The variable displacement pump 2, depending upon the direction in which it is set, delivers either via the conduit 3 into the conduit 4 and draws correspondingly out of the conduit 5, in which case the hydraulic motor 6a connected to the conduits 4 and 6 gets rotated in the corresponding direction of rotation, or draws out of the conduit 3 and delivers via the conduit 5 into the conduit 6 and then drives the hydraulic motor in the opposite direction of rotation.

The auxiliary pump 8 delivers a flow dependent upon the r.p.m. of the shaft 7 into the conduit 9 and through it to the restrictor 11. In front of the latter a pressure is generated which is fed via the conduit 12 to the regulating solenoid valve 14 and from this conduit 12 via the conduit 21 to the regulating solenoid valve 20. If the conduit 34 leads to a drain container, the conduits 13 and 15 are omitted. If in this case the regulating solenoid valve 14 is opened by an electrical signal, the pressure chamber 17 is acted upon by pressure via the conduit 16 and the pilot piston 18 is shifted against the force of the spring 19 towards the right in the drawing. But the force generated against the pilot piston 18 by the pressure in the pressure chamber 17 is opposed not only by the force of the spring 19, but also by the force which is exerted in the pressure chamber 42 against the end face of the auxiliary piston 43.

If the pump 2 gets swung over in the other direction of delivery, the regulating solenoid valve 14 remains closed and the regulating solenoid valve 20 is opened by a signal. This results in the pressure in front of the restrictor 11 being fed via the conduit 21, the regulating solenoid valve 20 and the conduit 22 to the pressure chamber 23. The pilot piston 18 is then correspondingly shifted by the pressure in this pressure chamber 23 against the force of the spring 24 and against the force which is exerted in the pressure chamber 39 against the end face of the auxiliary piston 40.

In the absence of the auxiliary pistons 40 and 43 with the associated pressure chambers 39 and 42 and associated conduits 38 and 41, the method of operation of the control is such that the pressure in front of the restrictor 11 in each case influences the position of adjustment of the variable displacement pump 2 of the hydrostatic transmission in such a way that a certain position of adjustment of the pump 2 is correctly associated with a certain pressure in front of the restrictor 11 (or respectively a certain pressure ratio in front of and behind the restrictor 11) without any influence from friction and restoring forces on the positioning member of the pump. For many kinds of drive that is very advantageous but for others less so. For example, the hydrostatic transmission may be used for driving a power shovel which is being driven into bulk material with the r.p.m. of the combustion engine 1 being kept constant. In such a case, in a circuit without the auxiliary pistons 40 and 43, the position of adjustment of the pump 2 would not alter when the force against the shovel rises. This means that the pressure in the delivery conduit of the transmission ("back pressure") would rise until the engine 1 becomes highly loaded in such a way that because of overloading the r.p.m. drop. Only with dropping r.p.m. would the discharge flow from the auxiliary pump 8 drop, and this in turn would result in a drop in the pressure in front of the restrictor 11 and consequently the pump 2 would be shifted back to a smaller delivery per revolution.

But if the auxiliary pistons 40 and 43 are present (or if in some other way a counter-effect against the control pressure is provided which depends upon the high "back pressure" in the output of the pump 2), even if the engine 1 maintains the same r.p.m. when the "back pressure" rises, the delivery from the pump 2 gets reduced. On the other hand, with this device just as in the case of known ones, the r.p.m. of the auxiliary pump 8 can also be reduced by throttling back the setting of the combustion engine 1 to lower r.p.m. and the pressure in front of the restrictor 11 will be thereby reduced. Thus, when the r.p.m. of the combustion engine 1 is throttled back or forced down by overloading even at constant pressure in the transmission circuit, the pump 2 gets set back to a smaller discharge volume per revolution. On the other hand at falling pressure in the transmission even at the same r.p.m. the discharge volume of the pump rises. For applications such as those mentioned, an advantageous regulation or a sensitive control of the hydrostatic transmission is thereby made possible.

In order not to generate by the series connection of the pressure in the conduit 36 (which is necessary for the further connected loads) with the pressure dammed up previously in front of the restrictor 11, too high a discharge pressure in the conduit 9 and hence an unnecessarily high power requirement for the auxiliary pump 8, circuits well known to those skilled in the art may be provided which ensure that a discharge flow is fed to the restrictor 11 which is dependent upon the r.p.m. of the shaft 7. Such a circuit nevertheless makes it possible that the pressure in the conduit 9 at least does not have to be substantially higher than in the conduit 34.

The solenoid valves 14 and 20 may be simple on/off solenoid valves. But they may also be regulating solenoid valves in which the fluid flow through the valve is directly proportional to the current through the solenoid. In this case further signals may be superimposed. Instead of the hydraulic circuit shown in FIG. 1 it may also be provided that the regulating solenoids of the valves 14 and 20 are connected directly to the generator 44.

Figure 5:
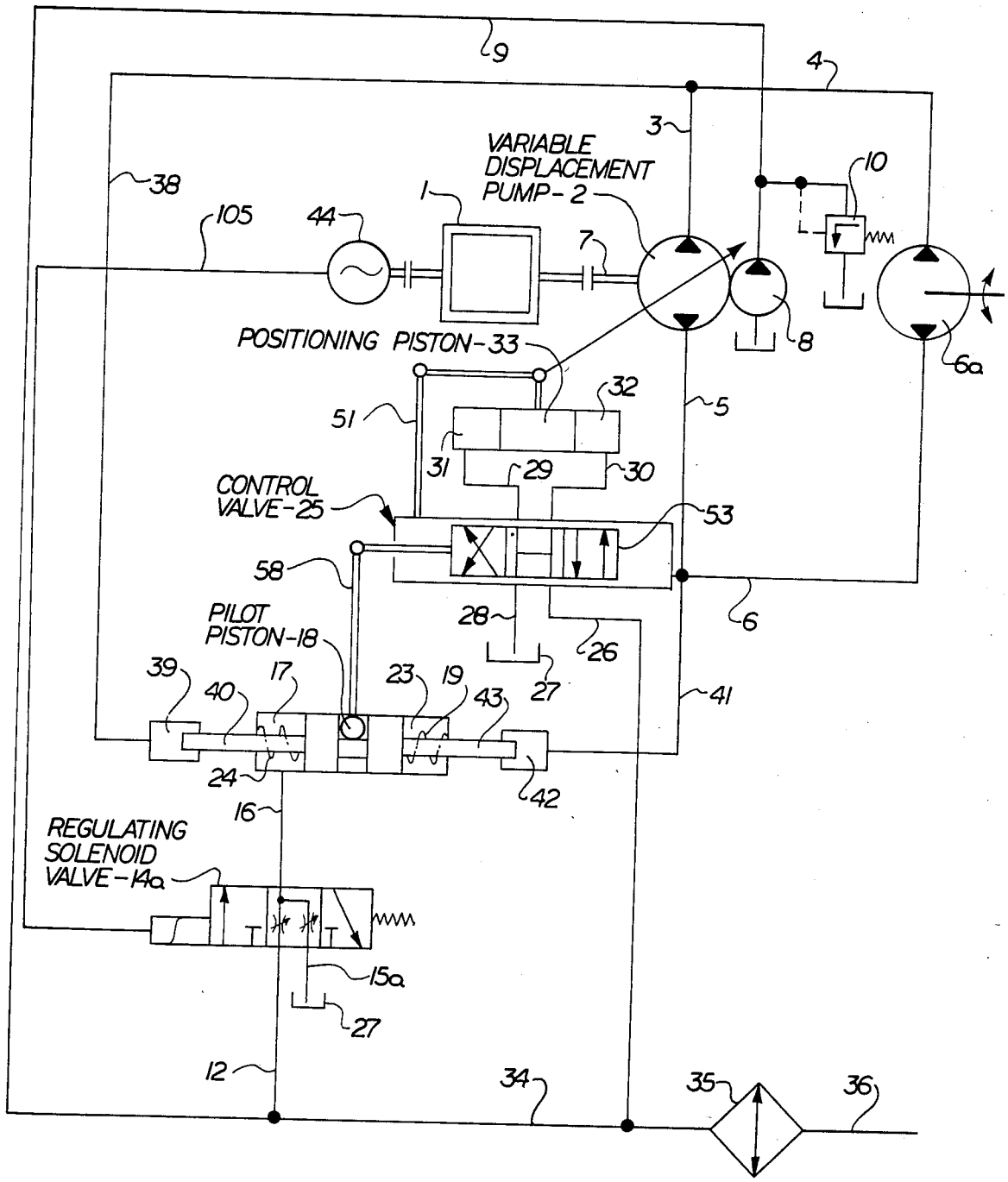
FIG. 5 shows a diagram illustrating a third embodiment of the invention.

When generator 44 is used to provide a control signal, the device of FIG. 1 can be simplified. As shown in FIG. 5, in which the same numbers refer to parts similar to those of other embodiments, fluid pressure is supplied to chamber 17 and acts on only one face of piston 18. Spring 19 presses on the other face of the piston 18 to oppose the fluid pressure in chamber 17. Chamber 23 is at atmospheric pressure. When an electrical control signal is used, the restrictor 11 also can be eliminated. The fluid flow to and from chamber 17 is controlled by a solenoid operated, infinitely adjustable three-way valve 14a. The conduit 12 leads to the inlet of the valve 14a, and the conduit 16 leads from an outlet of the valve 14a to the chamber 17. The other outlet of the valve 14a is connected with the reservoir 27 by a conduit 15a. Wire 105 connects the solenoid of the valve 14a and generator 44.

The control of FIG. 5 operates in the following manner. In neutral position fluid pressure in chamber 17 and the forces of spring 24 balance the biasing force of the spring 19, and the piston 18 occupies its neutral position. When the piston 18 is in this neutral position, the control valve 25 is in its central position and the displacement of pump 2 is constant. When the speed of the engine 1 increases, the electrical signal generated by the generator 44 actuates the solenoid of the valve 14a in such a manner as to increase the pressure in conduit 16 causing fluid to flow to the chamber 17. The piston 18 then moves to the right against the bias of the spring 19 and causes an increase in displacement of the pump 2. When the speed of engine 1 decreases, the electrical signal generated by the generator 44 actuates the solenoid of the valve 14a in a manner to vent the fluid pressure in the chamber 17 to the reservoir. In this case piston 18 moves to the left under biasing force of the spring 19 to thereby reduce displacement of the pump 2, which is effective to overcome the force of spring 29. Operation of the pistons 40 and 43 remains unchanged.

Figure 6:
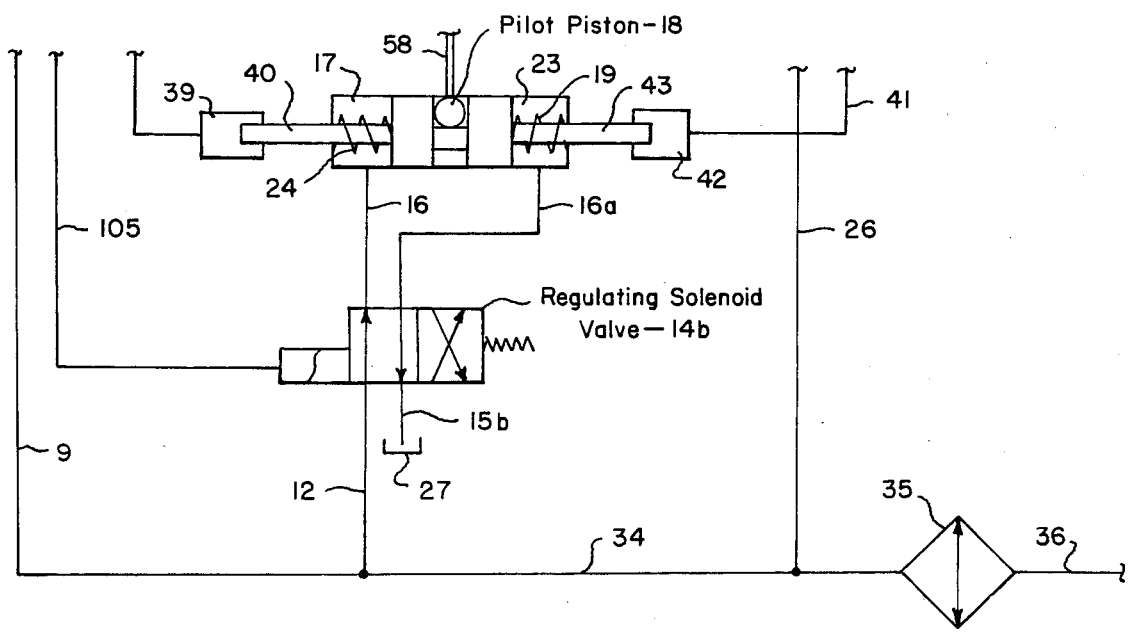
FIG. 6 shows yet another embodiment of the present invention.

A simple reversing valve such as valve 14b (FIG. 6) can also be used when fluid pressure is supplied to both pressure chambers 17 and 23. In this case, the biasing force of springs 19 and 24 is equal. Upon increase of the speed of the engine 1, the valve 14b is actuated to increase fluid flow to the chamber 17 and provide for venting the chamber 23 to the reservoir 27 via a conduit 15b. This causes movement of the piston 18 to the right and corresponding increase in displacement of the pump 2. When the speed of engine 1 decreases, the valve 14b is actuated to increase fluid flow to the chamber 23 and vent the chamber 17. The piston 18 moves to the left, and displacement of the pump 2 decreases.

Figure 2:
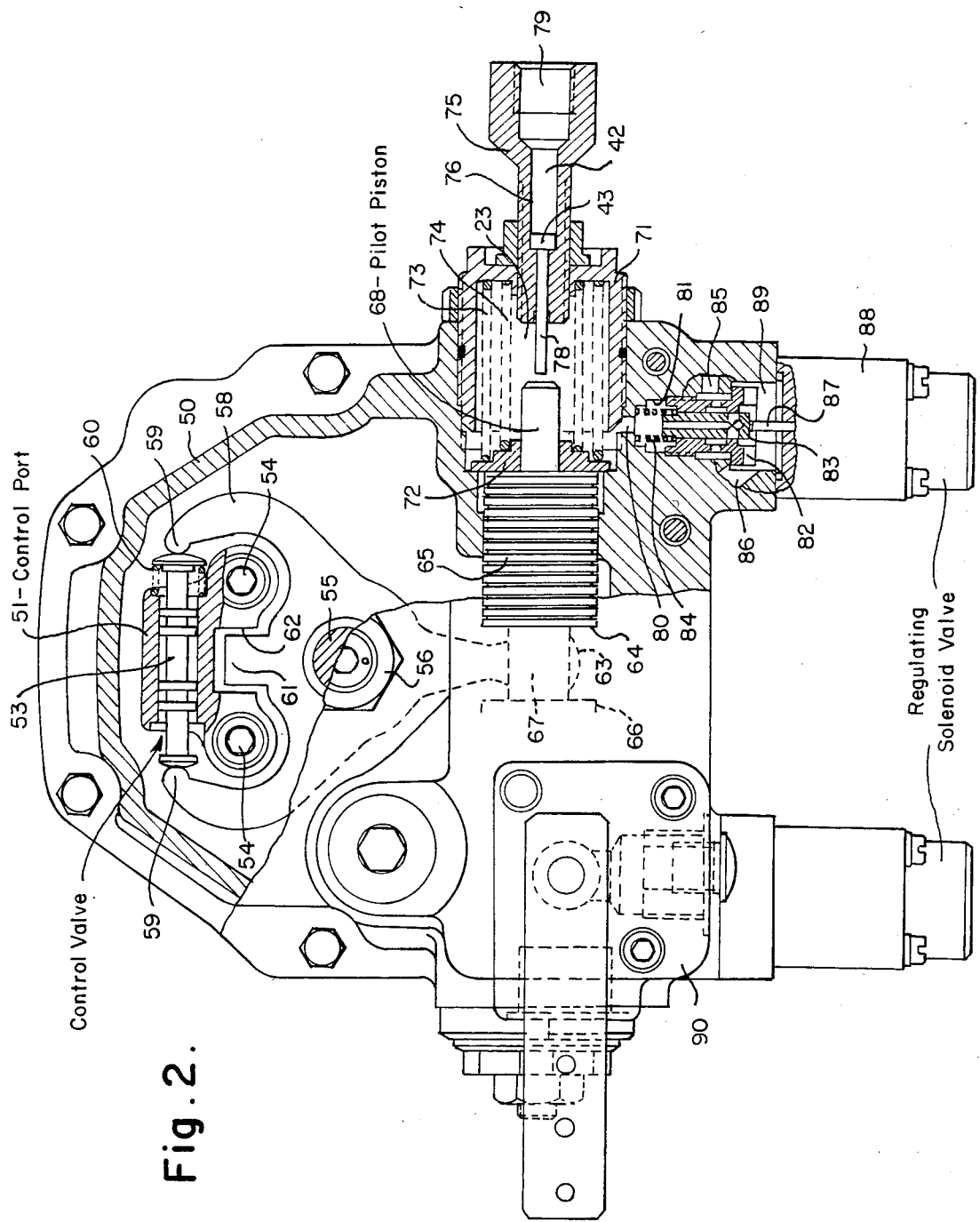
FIG. 2 shows a servo-positioning device with a solenoid valve and auxiliary piston partially in section.
Figure 3:
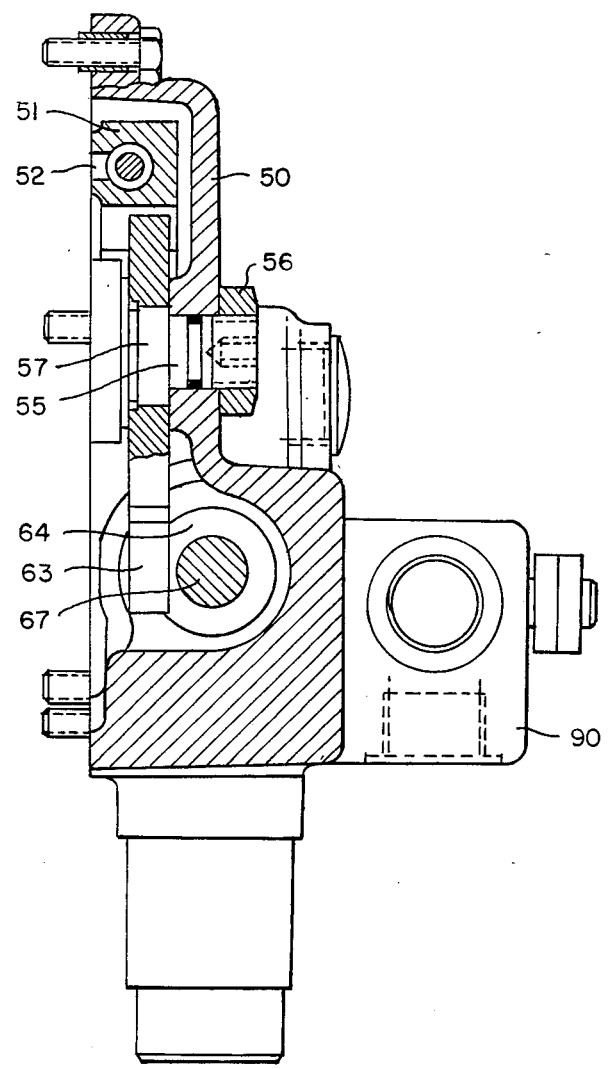
FIG. 3 shows a section through the device in accordance with FIG. 2 perpendicular to the plane of section in FIG. 2.

FIGS. 2 and 3 illustrate a practical embodiment of the control circuit shown in FIG. 1. In FIGS. 2 and 3, a side cover plate 50 is mounted on the housing of an adjustable swashplate pump (not shown). The swashplate of the pump is formed on a rocker, in such a way that the side face on the left in FIG. 3 corresponds exactly with the side face of the rocker. A control part 51 is connected rigidly to the rocker by two bolts 54 and includes a bore in which a valve member 53 slides. Three channels 52 are formed in the control part 51 of which only the central one lying in the plane of drawing in FIG. 3 is shown. This central channel corresponds to the conduit 26 of FIG. 1 and is connected to a feed channel for hydraulic fluid arranged in the rocker. The two other channels are connected each to a fluid chamber (31 and 32 in FIG. 1), and a piston is arranged in each of these fluid chambers by means of which the rocker can be swivelled in one direction or the other. These three channels 52 are controlled by means of the valve member 53 of a 4-way control valve. This 4-way control valve is shown schematically in FIG. 1 at 25.

A bearing bolt 55 is supported in the cover plate 50 and secured by a nut 56. This bearing bolt 55 is provided with an eccentric part 57 upon which a fork 58 is supported. By means of the eccentric part 57 of the bearing bolt 55 the position of the fork 58 with respect to the pilot piston 18 and the valve member 53 can be finely adjusted so that accurate setting of the zero position is possible.

The fork 58 includes two arms 59 each of which rests at one end directly against the valve member 53 which is held on one side by means of a spring 60 in contact against the arm 59. The fork 58 further includes a central dog 61 which lies with clearance between two contact faces 62 on the fastening of the control part 51. When the valve member 53 is displaced out of its neutral position by a relative swivelling of the fork 58 with respect to the rocker, and the rocker because of the flow of hydraulic fluid does not follow this displacement, the dog 61 comes into contact with a face 62 on one side and thereby carries the control part 51 along with it purely mechanically and with it the rocker.

At the end at the bottom in FIG. 2 the fork 58 is provided with a cylindrical contact part 63 which lies with a very small clearance between two contact faces 64 which are formed on the two pilot pistons 65 and 66. These two pilot pistons 65 and 66 and the central part 67 and two end parts 68 form together a symmetrical working part indicated generally by the numeral 18 in FIG. 1. Each of the two pilot pistons 65 and 66 can be displaced in a cylindrical bore which is connected to a pressure chamber. The pressure chamber 23 is associated with the pilot piston 65 and is closed off by a threaded cover 71 with an O-ring. The pilot piston 65 rests with its end face to the right in the drawing against a spring plate 72 against which bear the two springs 73 and 74 which at the other end bear against the threaded cover 71. In the position shown in the drawing, the spring plate 72 bears against the housing.

An auxiliary pressure chamber part 75 is screwed into the threaded cover 71, a cylindrical bore 76 being provided in it, which forms the pressure chamber 42 in which the auxiliary piston 43 can be displaced. A piston rod 78 connected with the piston 43 rests close to the end part 68 of the servo-piston 65. The pressure chamber 42 is connected via the connection 79 with the conduit 41 which is not further illustrated in FIG. 2.

To the pressure chamber 23 is connected a bore 80 which functionally corresponds with the conduit 22 in FIG. 1. The bore 80 leads to a bore 81 in which is inserted a valve part 82. The valve part 82 in turn includes a central bore in which a valve body 83 can be displaced against the force of a spring 84. In the housing a side bore 85 is also provided, which is connected to a conduit not further shown in FIG. 2, which corresponds with the conduit 13 in FIG. 1. A bore 86 is provided which leads to a drain conduit which is not shown. In each of the parts 82 and 83 is provided radial bores. The valve slide 83 rests against the pressure pin 87 which is connected rigidly to the core of a regulating solenoid 88. When the solenoid 88 is under voltage, the pin 87 exerts a force upon the valve slide 83 against the force of the spring 84. The pressure prevailing in the chamber 81 also acts in the same sense as the force of the spring 84. Through the longitudinal displacement of the valve slide 83 the radial bore in it may be brought into alignment with the radial bore in the part 82 so that hydraulic fluid penetrates through the bore 85 and the two radial bores into the axial bore in the slide 83 and thence out into the chamber 81 and out from it via the bore 80 into the pressure chamber 23. This flow continues until the sum of the forces of the spring 84 and the force from the pressure acting on the end face of the slide part 83 is adequate to slide the slide 83 back against the force exerted by the pin 87 until the radial bore in the slide 83 is closed by the wall of the axial bore in the part 82.

If the force exerted by the pin 87 on the slide 83 becomes smaller because of a reduction in the voltage applied to the solenoid 88, the sum of the forces of the spring 84 and the pressure leads to the situation that the slide 83 is pushed downwards in the drawing and hence the radial bore in the slide 83 connects with the chamber 89 which is connected to the pressureless drain channel 86. In this way hydraulic fluid escapes from the pressure chamber 23 until the pressure in the chamber 23 has dropped so far that the force now prevailing on the pressure pin 87 is adequate to push the valve slide 83 back again far enough for the radial bore in it to be closed by the part 82.

The device is constructed symmetrically, that means that exactly the same arrangement is to be found in the lefthand part not sectioned in FIG. 2 as in the righthand part.

The method of operation is as follows: If a voltage is applied to neither of the two solenoids 88 (FIG. 2), the pressure pin 87 exerts no force on the slide 83, so that under the action of the spring 84 the slide 83 is forced into the position in which the radial bore in the slide 83 is connected to the chamber 89. If voltage is applied to one of the solenoids 88, the associated pressure chamber 23 (or respectively on the lefthand side, 17) is acted upon in the described manner by pressure, this pressure then acts upon the pilot piston 65 (or 66 respectively) and hence the fork 58 swivels about the eccentric 57. The control valve piston 53 is then controlled by the fork motion with the result that under the action of the hydraulic fluid the rocker follows this swivelling motion. If in addition the cylindrical bore 76 forming the pressure chamber 42 or 39, respectively, is acted upon by pressure, an additional force is exerted on the servo-piston via the auxiliary piston 43 and the piston rod 78.

Figure 4:
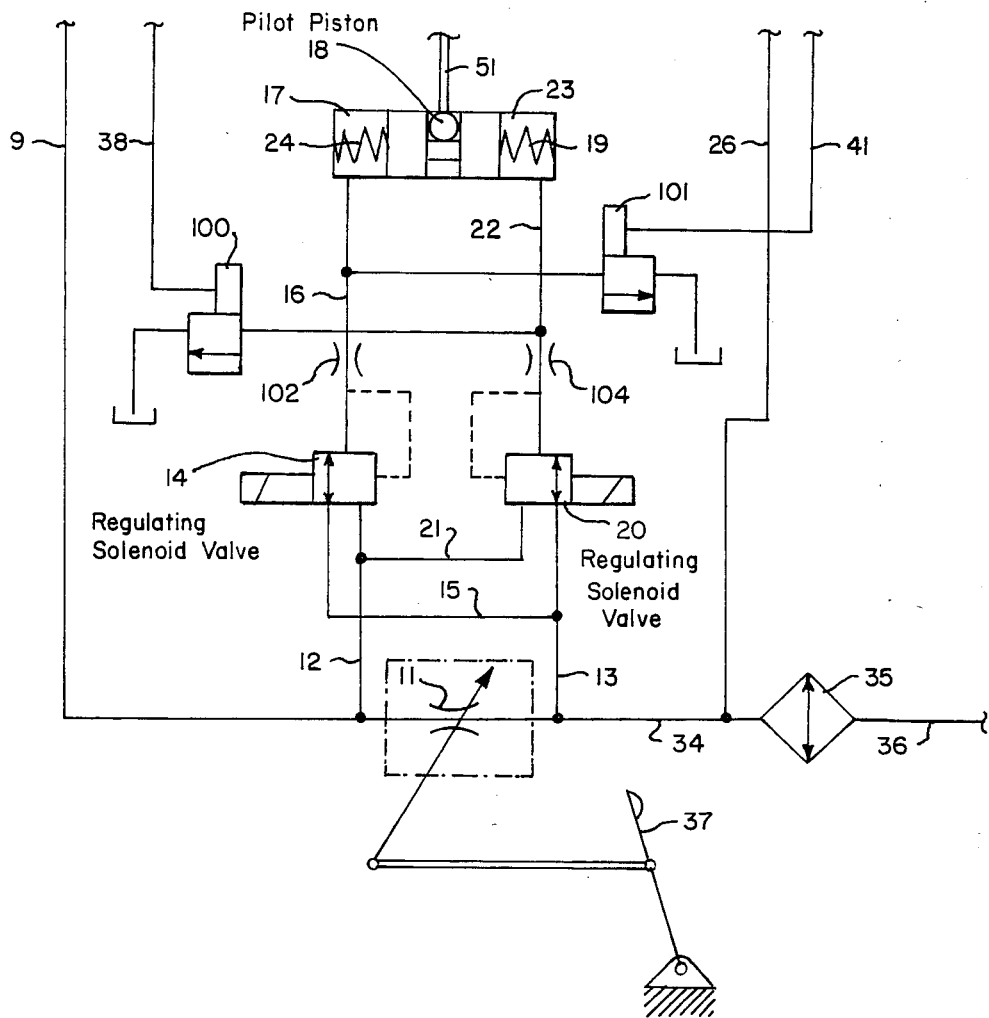
FIG. 4 shows a diagram illustrating a second embodiment of the present invention.

Another embodiment of the present invention is illustrated in FIG. 4 in which the same numerals have been used to indicate similar parts. In this embodiment the "back pressure" from the variable displacement pump 2 controls powered valves 100 and 101. The powered valves 100 and 101 control the flow from conduits 16 and 22, respectively, to drain. When excessive "back pressure" builds up in, e.g., conduit 5, this pressure is communicated through line 41 to open valve 101. This causes the pressure in chamber 17 to be reduced which in turn causes the pump 2 to be adjusted toward a smaller displacement. The valve 100 is similarly connected with conduit 3 and chamber 23. Thus, the valves 100 and 101 operate with the same effect as the cylinders 39 and 42 and pistons 40 and 43 of FIG. 1.

When the valves 100 and 101 are utilized it is necessary to add restrictors 102 and 104 between the point where the pressure is taken off of line 9 and the connection with the drain. These restrictors limit the flow to the drain.

What is claimed is:
1. An apparatus in combination with a hydrostatic transmission including a variable displacement pump and a motor, said variable displacement pump having an input shaft driven by an engine, said apparatus comprising servo-positioning means for varying the displacement of said variable displacement pump, signal producing means for producing a first signal dependent upon the rotational speed of said input shaft, means for communicating said first signal dependent on the rotational speed of said input shaft to said servo-positioning means, means for communicating a second signal dependent upon the output pressure of said variable displacement pump to said servo-positioning means, said servo-positioning means including means responsive to the difference between said first signal dependent on the rotational speed of said input shaft and said second signal dependent on said variable displacement pump output pressure, said means for producing said first signal dependent on the rotational speed of said input shaft for said pump including a constant displacement pump connected with said input shaft of said variable displacement pump, said means for communicating said first signal to said servo-positioning means including an output line from said constant displacement pump, a restrictor in said output line, said conduit means for conducting the pressure upstream of said restrictor to said servo-positioning means, said variable displacement pump being adapted to provide a reversible flow of fluid, said servo-positioning means includes a piston having two piston faces and axially slidable in a bore and a pressure chamber at each end of said bore, and a pair of opposed auxiliary pistons axially slidable in an auxiliary bore under the influence of said second signal dependent on the output pressure of said variable displacement pump, said auxiliary pistons abuttingly engaging said piston to thereby influence the axial position of said piston in said bore, said conduit means for conducting the pressure upstream of said restrictor to said servo-positioning means includes conduits connected with each of said pressure chambers and individually actuable solenoid valves controlling the flow of fluid in said conduits.

2. An apparatus as set forth in claim 1 wherein said solenoid valves include means for biasing said solenoid valves to a closed position and pressure responsive means for moving said solenoid valves to an open position.

3. An apparatus as set forth in claim 2 wherein the constant displacement pump as said means for producing a signal dependent on the rotational speed of said input shaft to said variable displacement pump is replaced by means for producing an electrical signal dependent on the rotational speed of said input shaft and circuit means conducting the electrical signal so produced to said solenoid valves, said solenoid valves being electrically controlled.

4. An apparatus for use in controlling a variable displacement pump in combination with a hydrostatic transmission including a variable displacement pump and motor, said variable displacement pump having an input shaft driven by an engine, said apparatus comprising servo-positioning means for varying the displacement of said variable displacement pump, signal producing means for producing a first signal dependent upon the rotational speed of said input shaft, means for communicating said first signal dependent on the rotational speed of said input shaft to said servo-positioning means to increase or decrease the displacement of said variable displacement pump as the rotational speed of said input shaft increases or decreases, respectively, and means for communicating a second signal dependent on the output pressure of said variable displacement pump to said servo-positioning means to act in opposition to said first signal to tend to decrease or increase the displacement of said variable displacement pump, said servo-positioning means including means responsive to the difference between said first signal dependent on the rotational speed of said input shaft and said second signal dependent on said variable displacement pump output pressure, said means responsive to the difference between said first signal dependent on the rotational speed of said input shaft and said second signal dependent on said variable displacement pump output pressure including a piston having two piston faces, said piston being axially slidable in a bore, and a pressure chamber located at each end of said bore, said means for communicating said first signal to said servo-positioning means comprising an output line from a source of fluid, a restrictor in said output line, and conduit means for conducting the pressure upstream of said restrictor to said servo-positioning means, said conduit means for conducting the pressure upstream of said restrictor to said servo-positioning means including conduits connected with each of said pressure chambers, and individually actuatable regulating solenoid valves regulating the flow of fluid in said conduits, said signal producing means for producing said first signal dependent on the rotational speed of said input shaft including sensing means for sensing the rotational speed of said input shaft and generating an electrical signal to control said regulating solenoid valves to thereby regulate the flow of fluid therethrough.

5. An apparatus as set forth in claim 4, wherein said speed sensing means is a generator connected to said input shaft.

* * * * *